(12) United States Patent
Araki et al.

(10) Patent No.: US 10,502,891 B2
(45) Date of Patent: Dec. 10, 2019

(54) DISPLAY DEVICE AND ILLUMINATION DEVICE

(71) Applicant: Sony Corporation, Tokyo (JP)

(72) Inventors: Soya Araki, Kanagawa (JP); Takao Sumida, Aichi (JP); Takeshi Yamamoto, Tokyo (JP); Tomoyuki Yoshimatsu, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/502,313

(22) PCT Filed: Jul. 8, 2015

(86) PCT No.: PCT/JP2015/069600
§ 371 (c)(1),
(2) Date: Feb. 7, 2017

(87) PCT Pub. No.: WO2016/031397
PCT Pub. Date: Mar. 3, 2016

(65) Prior Publication Data
US 2017/0227705 A1    Aug. 10, 2017

(30) Foreign Application Priority Data
Aug. 28, 2014    (JP) .................. 2014-174201

(51) Int. Cl.
*G02F 1/133* (2006.01)
*F21V 8/00* (2006.01)
*G09F 9/35* (2006.01)

(52) U.S. Cl.
CPC ........... *G02B 6/0088* (2013.01); *G02B 6/002* (2013.01); *G02B 6/005* (2013.01); *G02B 6/0043* (2013.01);
(Continued)

(58) Field of Classification Search
CPC .... G02B 6/0088; G02B 6/002; G02B 6/0043; G02B 6/0055; G02B 6/0065; G02B 6/0085; G02B 6/0093; G02F 1/133615
See application file for complete search history.

(56) References Cited

U.S. PATENT DOCUMENTS

| | | | |
|---|---|---|---|
| 5,359,691 A * | 10/1994 | Tai | G02B 6/0016 362/561 |
| 6,447,135 B1 * | 9/2002 | Wortman | G02B 6/0055 362/327 |

(Continued)

FOREIGN PATENT DOCUMENTS

| JP | 08146230 | 6/1996 |
|---|---|---|
| JP | 2002189211 A | 7/2002 |

(Continued)

OTHER PUBLICATIONS

International Search Report from PCT/JP2015/069600, dated Sep. 15, 2015, 3 pgs.

*Primary Examiner* — James A Dudek
(74) *Attorney, Agent, or Firm* — Lerner, David, Littenberg, Krumholz & Mentlik, LLP

(57) ABSTRACT

A display device includes a display panel and an illumination section that illuminates the display panel. The illumination section includes: a light guide plate having a first surface and a second surface facing each other; a light source facing an end surface of the light guide plate; an adhesive layer formed adjacent to the first surface of the light guide plate and having substantially the same refractive index as a refractive index of the light guide plate; and a light reflection layer bonded to the first surface of the light guide plate with at least the adhesive layer in between.

13 Claims, 9 Drawing Sheets

(52) U.S. Cl.
CPC ......... *G02B 6/0051* (2013.01); *G02B 6/0055* (2013.01); *G02B 6/0065* (2013.01); *G02B 6/0085* (2013.01); *G02B 6/0093* (2013.01); *G02B 6/0046* (2013.01); *G09F 9/35* (2013.01)

(56) References Cited

U.S. PATENT DOCUMENTS

| | | | |
|---|---|---|---|
| 2003/0128318 A1* | 7/2003 | Yoshii | G02F 1/133615 349/114 |
| 2005/0276073 A1* | 12/2005 | Mi | G02F 1/133615 362/609 |
| 2014/0092631 A1 | 4/2014 | Fujii et al. | |
| 2016/0003998 A1* | 1/2016 | Benoit | G02F 1/133502 349/71 |

FOREIGN PATENT DOCUMENTS

| | | |
|---|---|---|
| JP | 2003511727 | 3/2003 |
| JP | 2013008016 A | 1/2013 |
| JP | 2013093195 A | 5/2013 |
| JP | 2013175288 A | 9/2013 |

* cited by examiner

[ FIG. 1 ]
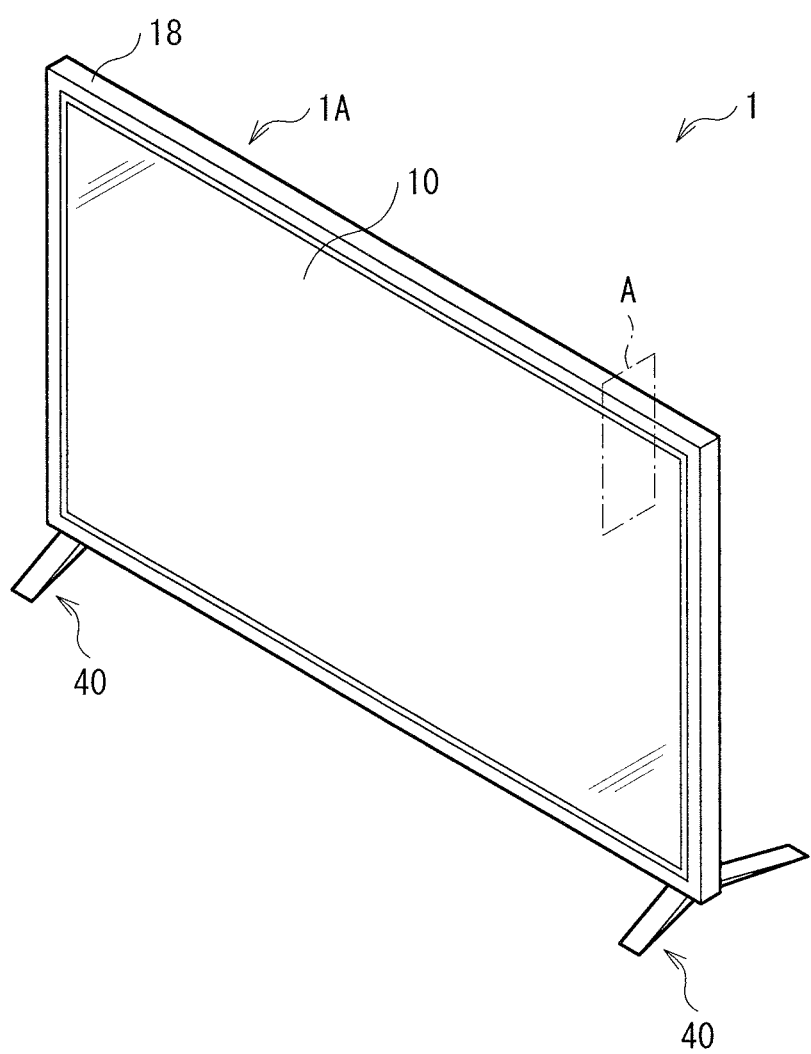

[ FIG. 2 ]
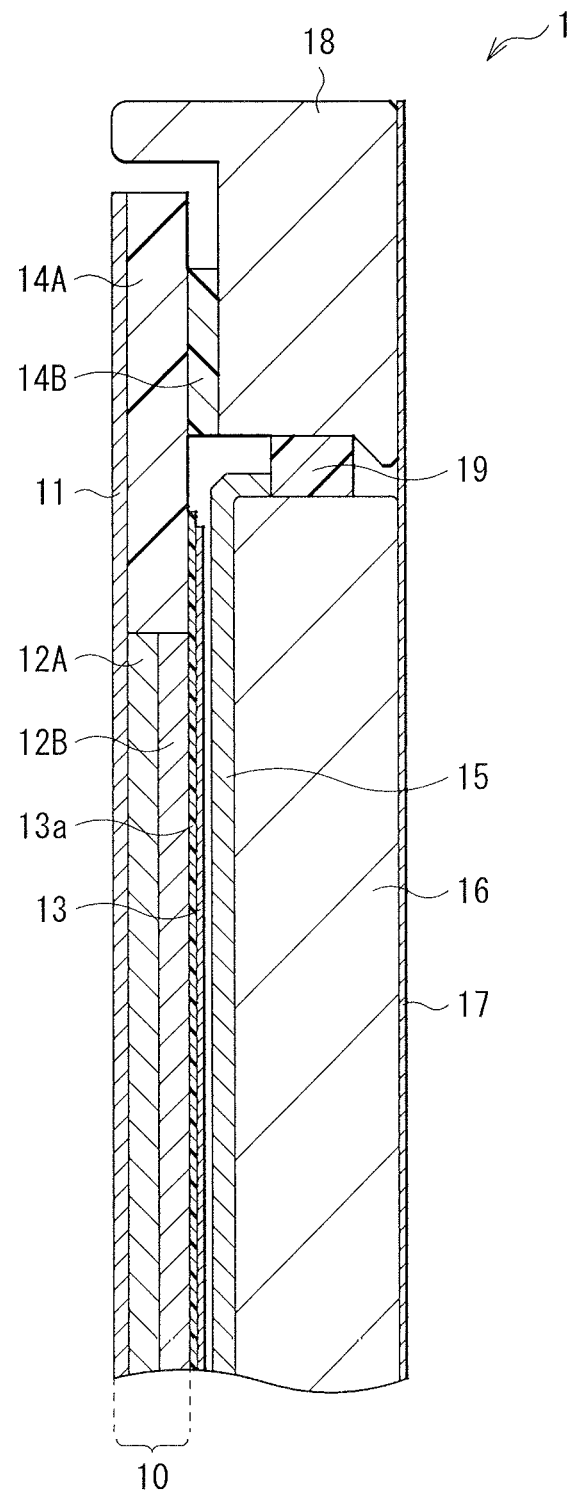

[FIG. 3]
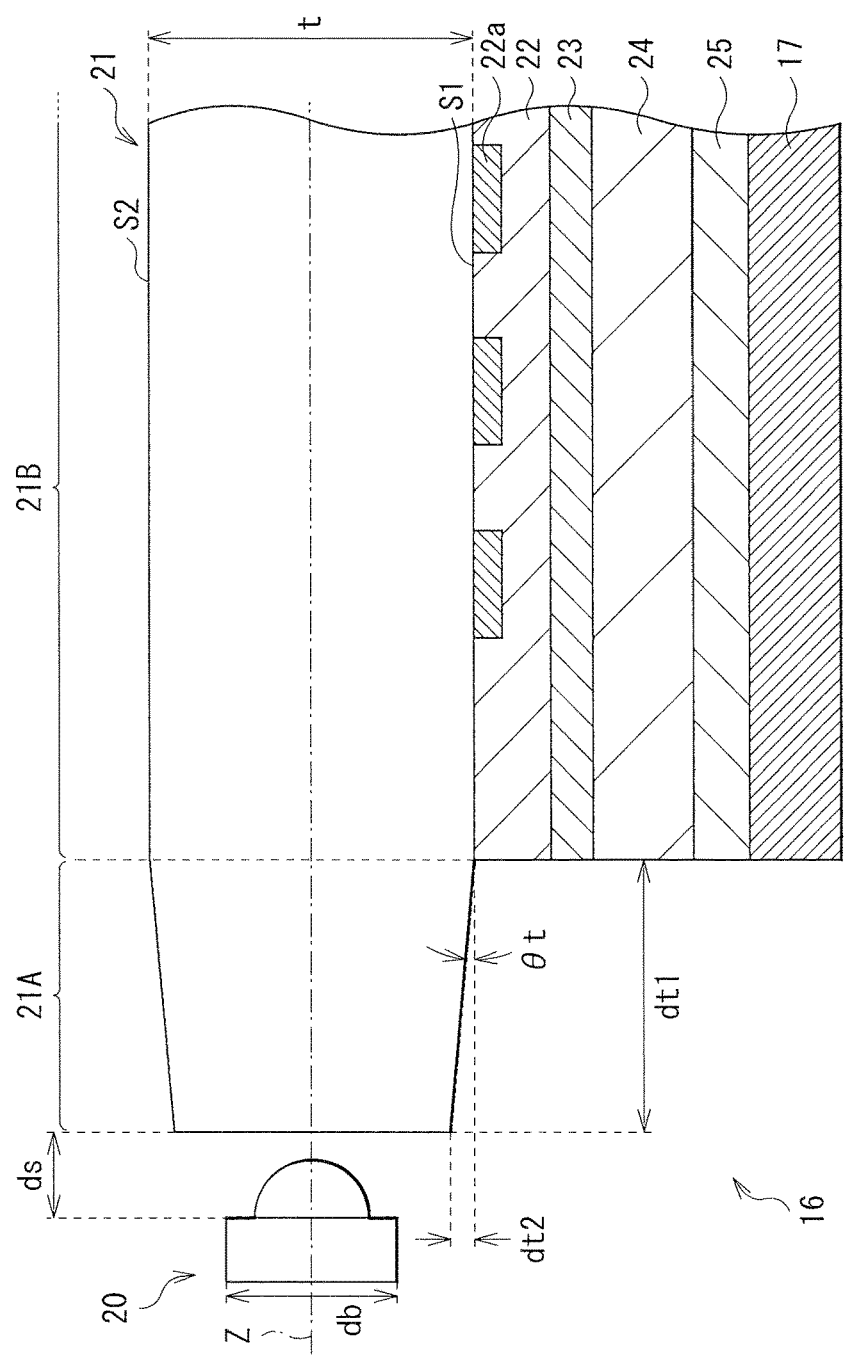

[ FIG. 4A ]
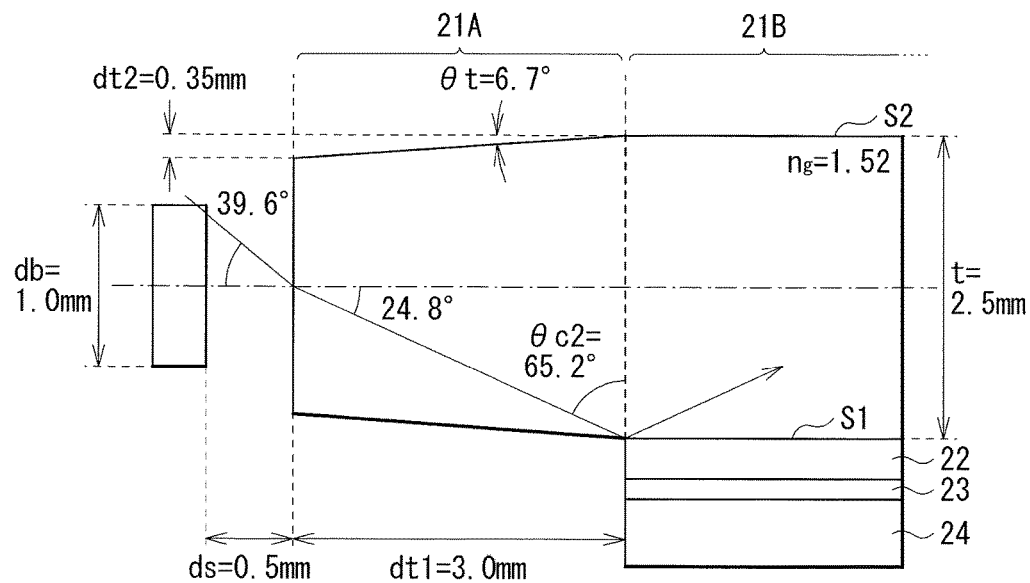
[ FIG. 4B ]
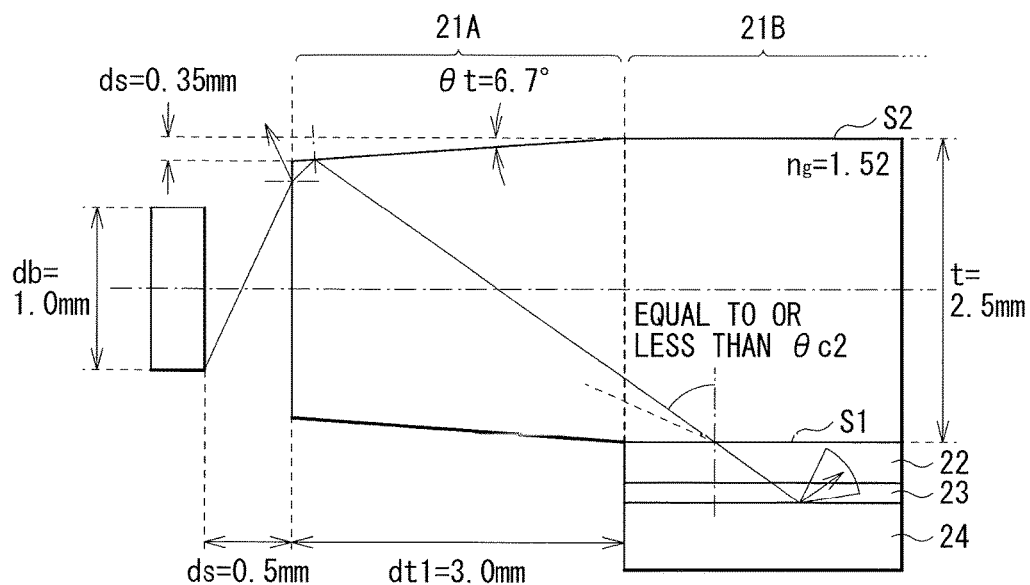

[FIG.5]
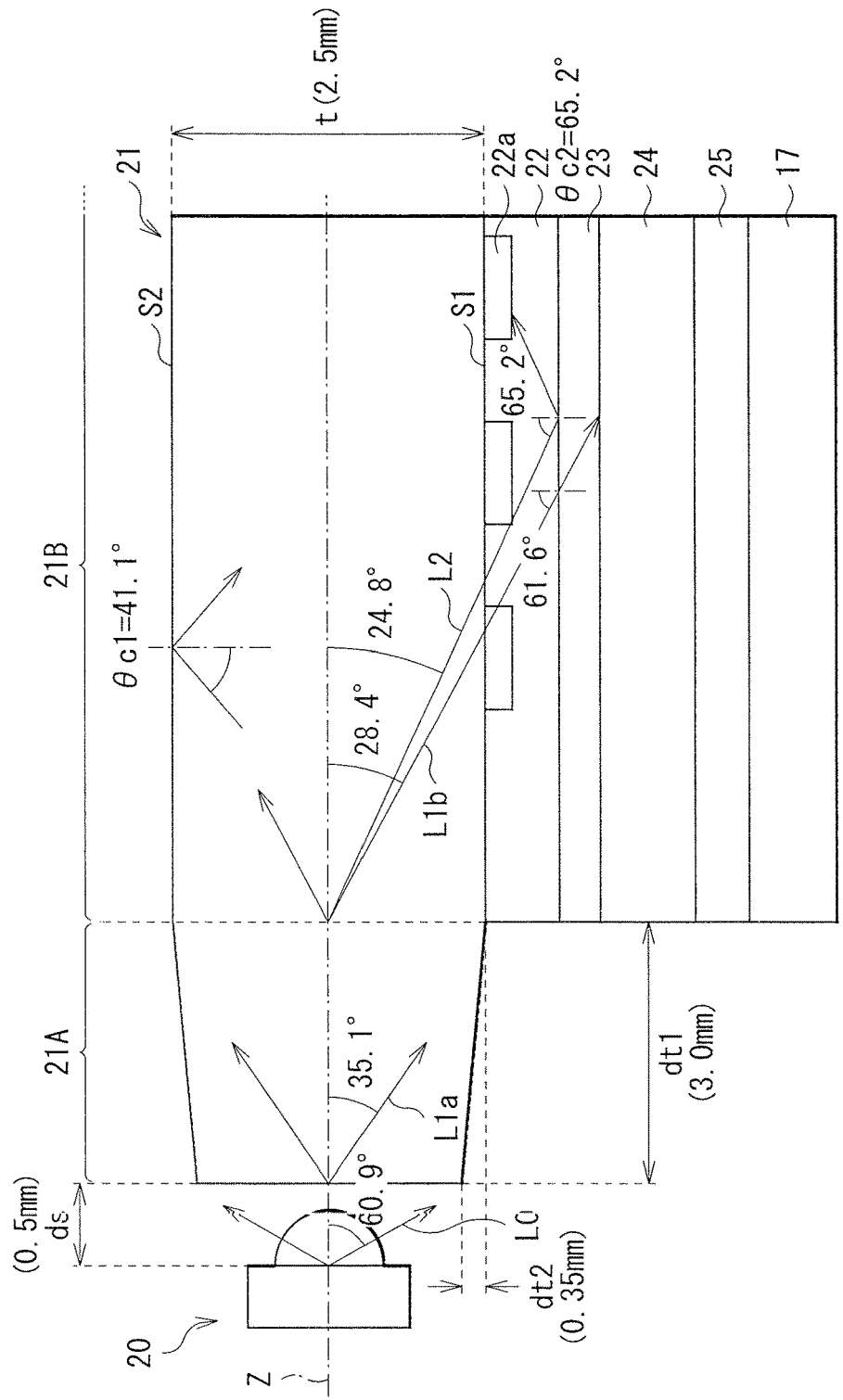

[ FIG. 6 ]
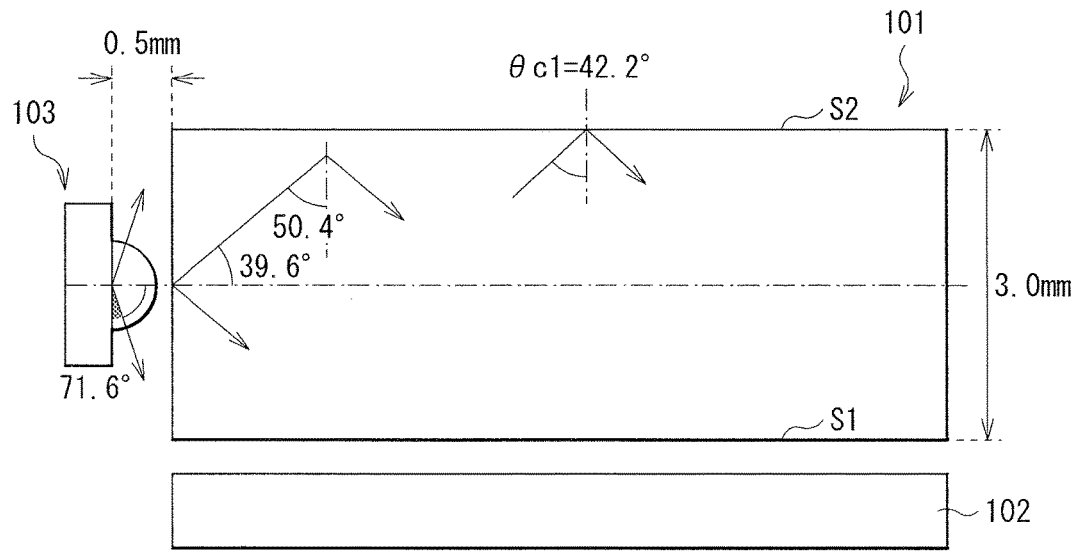
[ FIG. 7A ]
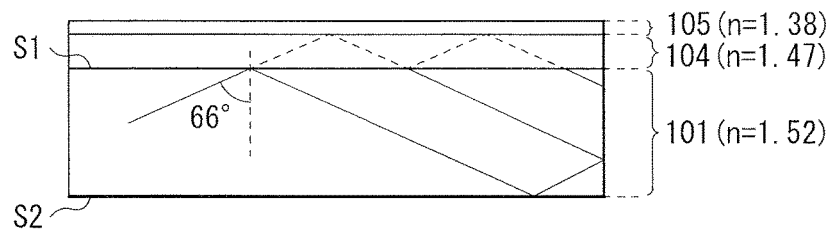
[ FIG. 7B ]
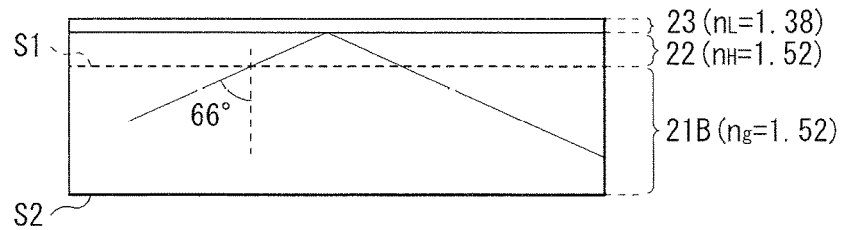

[ FIG. 8 ]
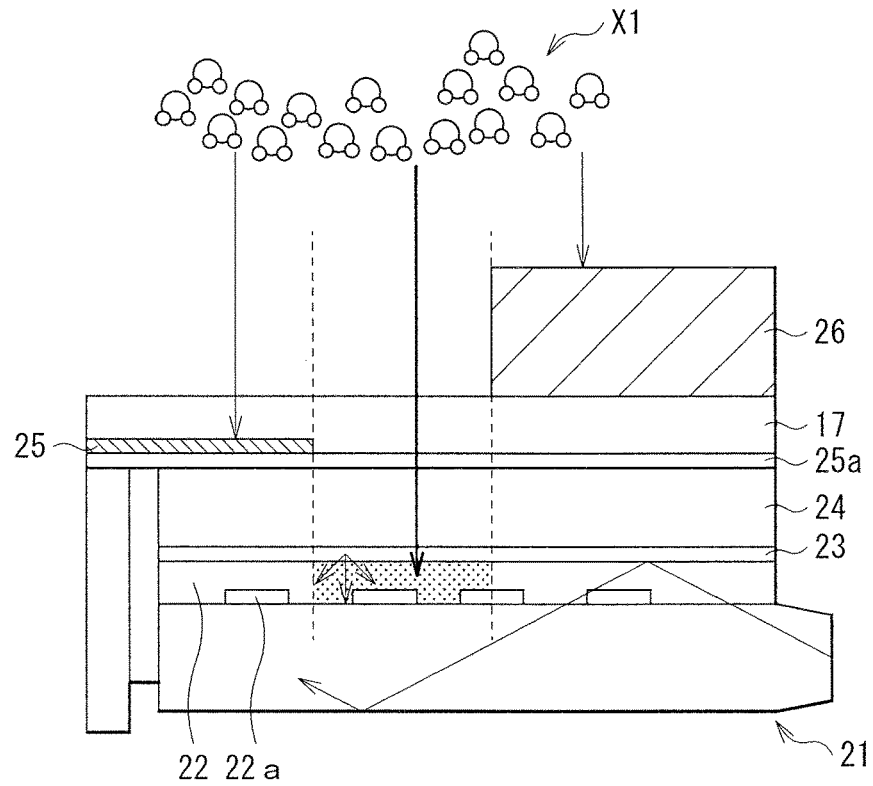
[ FIG. 9 ]
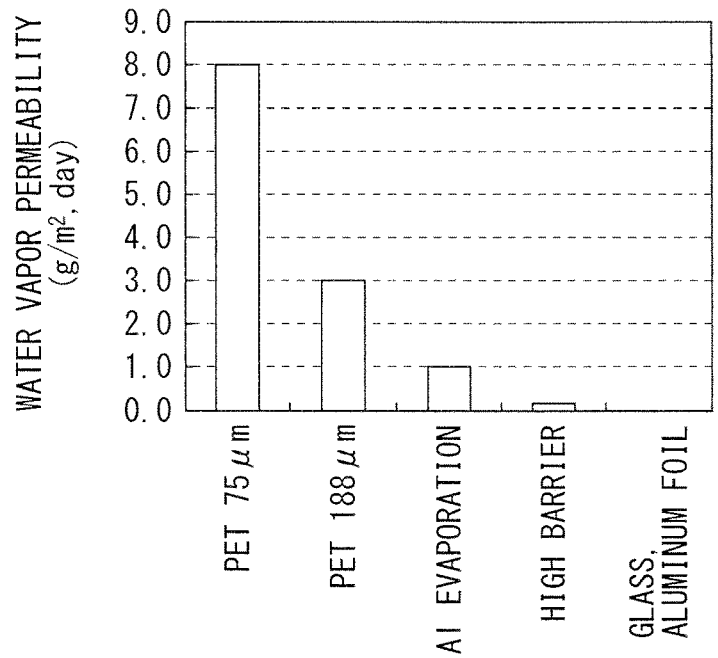

[ FIG. 10 ]
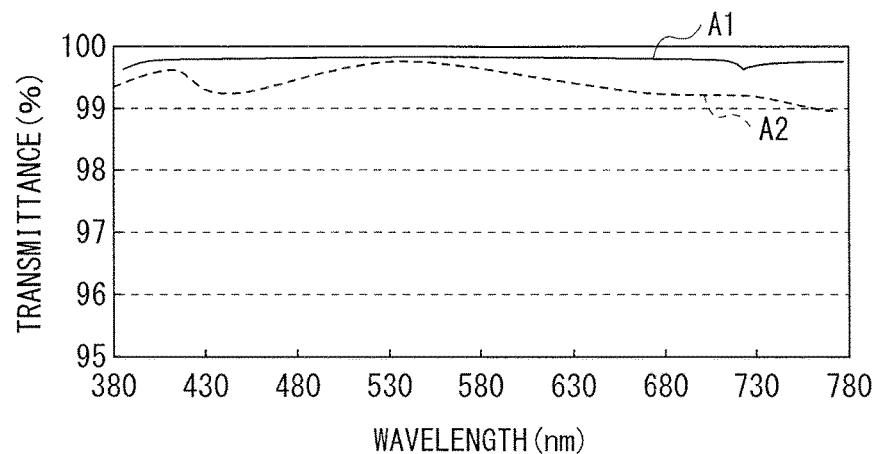
[ FIG. 11 ]
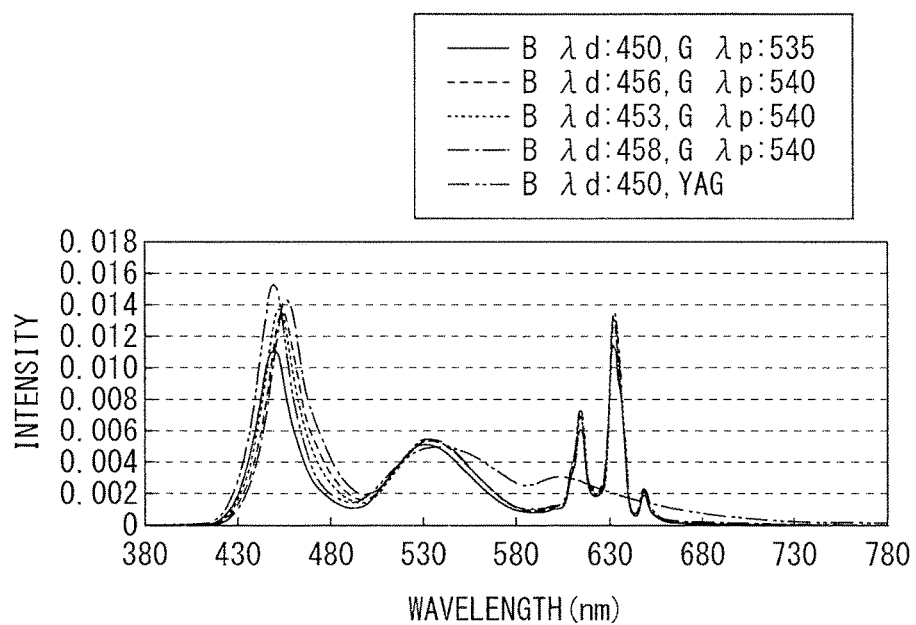

[ FIG. 12 ]
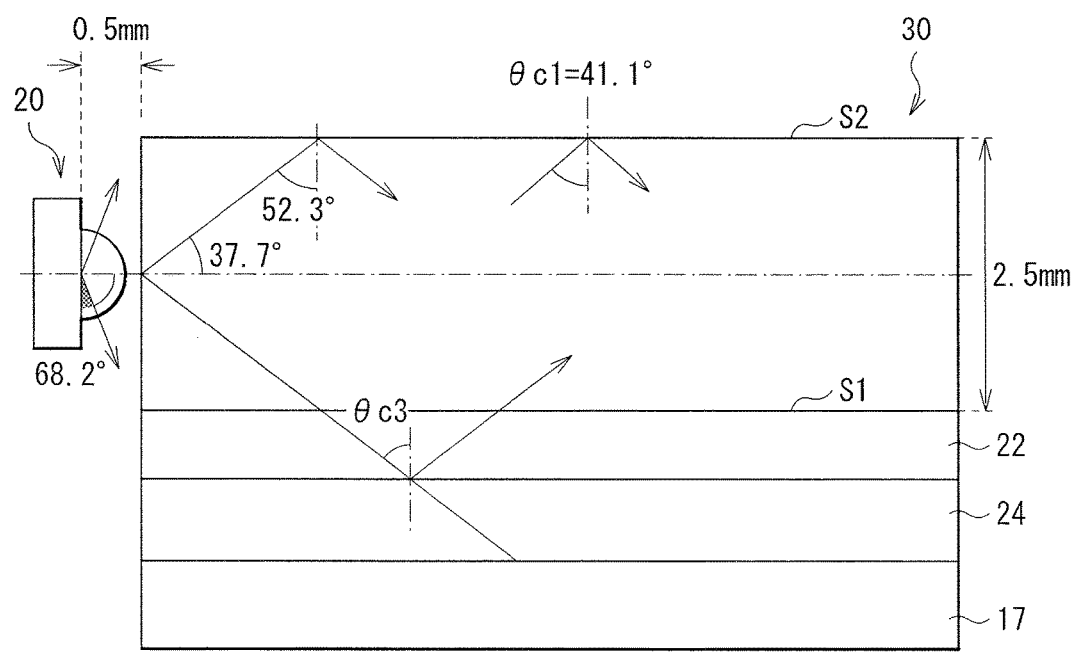

DISPLAY DEVICE AND ILLUMINATION DEVICE

CROSS-REFERENCE TO RELATED APPLICATIONS

This application is a national phase entry under 35 U.S.C. § 371 of International Application No. PCT/JP2015/069600 filed Jul. 8, 2015, which claims the priority from Japanese Patent Application No. 2014-174201, filed in the Japanese Patent Office on Aug. 28, 2014, the entire contents which are hereby incorporated by reference.

TECHNICAL FIELD

The present disclosure relates to a display device and an illumination device that are used for a television or any other apparatus.

BACKGROUND ART

In a display device such as a liquid crystal display device, a backlight is provided on a back surface of a display panel. An example of the backlight may be a surface-emitting illumination device using, for example, a light guide plate. In such an illumination device, a reflection plate is provided on back surface side of the light guide plate, and there is proposed a configuration in which the reflection plate is bonded to a back surface of the light guide plate (refer to Patent Literature 1, for example).

CITATION LIST

Patent Literature

[Patent Literature 1] Japanese Unexamined Patent Application Publication No. 2013-093195

SUMMARY OF INVENTION

However, many light losses may occur in a bonding method in Patent Literature 1. It is desirable to achieve a light guide plate unit that makes it possible to reduce light losses.

It is therefore desirable to provide an illumination device that allows for reduction in light losses in a light guide plate unit to improve light guiding efficiency, and a display device including the illumination device.

A display device according to an embodiment of the present disclosure includes a display panel and an illumination section that illuminates the display panel. The illumination section includes: a light guide plate having a first surface and a second surface facing each other; a light source facing an end surface of the light guide plate; an adhesive layer formed adjacent to the first surface of the light guide plate and having substantially the same refractive index as a refractive index of the light guide plate; and a light reflection layer bonded to the first surface of the light guide plate with at least the adhesive layer in between.

An illumination device according to an embodiment of the present disclosure includes a light guide plate having a first surface and a second surface facing each other; a light source facing an end surface of the light guide plate; an adhesive layer formed adjacent to the first surface of the light guide plate and having substantially the same refractive index as a refractive index of the light guide plate; and a light reflection layer bonded to the first surface of the light guide plate with at least the adhesive layer in between.

In the display device and the illumination device according to the embodiments of the present disclosure, the light reflection layer is bonded to the first surface of the light guide plate with the adhesive layer in between, and the adhesive layer has substantially the same refractive index as the refractive index of the light guide plate, which results in an increase in return light to the inside of the light guide plate and reduction in light losses in a gap between the light guide plate and the light reflection layer.

According to the display device and the illumination device of the embodiments of the present disclosure, the light reflection layer is bonded to the first surface of the light guide plate with the adhesive layer in between, and the adhesive layer has substantially the same refractive index as the refractive index of the light guide plate, which makes it possible to reduce light losses in the gap between the light guide plate and the light reflection layer. This allows for reduction in light losses in the light guide plate unit to improve light guiding efficiency.

Note that the above-described contents are merely examples. Effects achieved by the present disclosure are not limited to effects described above, and may further include other effects.

BRIEF DESCRIPTION OF DRAWINGS

FIG. 1 is a perspective view of an outer appearance of a display device according to an embodiment of the present disclosure.

FIG. 2 is a cross-sectional view of a configuration of a main portion of the display device illustrated in FIG. 1.

FIG. 3 is a schematic cross-sectional view of a configuration of a main portion of a light guide plate unit illustrated in FIG. 2.

FIG. 4A is a schematic cross-sectional view of a design example of the light guide plate unit illustrated in FIG. 3.

FIG. 4B is a schematic cross-sectional view of a design example of the light guide plate unit illustrated in FIG. 3.

FIG. 5 is a schematic cross-sectional view for description of workings of the light guide plate unit illustrated in FIG. 3.

FIG. 6 is a schematic cross-sectional view of a configuration of a main portion of a light guide plate unit according to a comparative example 1.

FIG. 7A is a schematic cross-sectional view for description of workings of a light guide plate unit according to a comparative example 2.

FIG. 7B is a schematic cross-sectional view for description of workings of the light guide plate unit illustrated in FIG. 3.

FIG. 8 is a schematic view for description of effects of a water vapor barrier layer illustrated in FIG. 3.

FIG. 9 is a characteristic diagram illustrating water vapor permeability of each material.

FIG. 10 is a characteristic diagram illustrating transmittance at each wavelength of an acrylic resin and glass.

FIG. 11 is a characteristic diagram illustrating light emission wavelength region of light sources.

FIG. 12 is a schematic cross-sectional view of a configuration of a main portion of a light guide plate unit according to a modification example.

MODES FOR CARRYING OUT THE INVENTION

Some embodiments of the present disclosure are described in detail below with reference to drawings. Note that description is given in the following order.

1. Embodiment (an example of a display device using a light guide plate unit in which a reflection sheet is bonded to a back surface of a light guide plate with an adhesive layer having a predetermined refractive index and a low refractive index layer in between)

2. Modification Example (an example in which a light interference reflection film is provided on the back surface of the light guide plate with the adhesive layer in between)

Embodiment

[Configuration]

FIG. 1 illustrates an outer appearance of a display device (a display device 1) according to an embodiment of the present disclosure. FIG. 2 illustrates a cross-sectional configuration example of a portion A in FIG. 1. The display device 1 may be a display device used as a television, for example. The display device 1 may include, for example, a main body 1A including a display panel (a liquid crystal panel 10) and an illumination section (such as a light guide plate unit 16, for example), and a stand 40. The illumination section may illuminate the liquid crystal panel 10. In the main body 1A, the liquid crystal panel 10 and the light guide plate unit 16 may be supported by, for example, a frame 18, and form a flat plate shape as a whole. Various kinds of optical sheets are bonded to each of the liquid crystal panel 10 and the light guide plate unit 16.

More specifically, a sealing resin layer 14A may be formed to cover an outer edge of the liquid crystal panel 10, as illustrated in FIG. 2. A surface of the sealing resin layer 14A and a surface (a surface on display side) of the liquid crystal panel 10 may form, for example, a same plane, and a protection-use cover film 11 may be attached to the surface of the sealing resin layer 14A and the surface of the liquid crystal panel 10. The liquid crystal panel 10 may be adhered to the frame 18 with a soft resin layer 14B in between (by the soft resin layer 14B), and the light guide plate unit 16 may be adhered to the frame 18 with an adhesive resin layer 19 in between (by the adhesive resin layer 19). An optical sheet 15 may be disposed on a surface on the liquid crystal panel 10 side of the light guide plate unit 16. A light shielding sheet 17 may be bonded to cover a back surface of the light guide plate unit 16 and the frame 18. In the following, description is given of specific configurations of respective components.

The liquid crystal panel 10 may display an image such as a moving image and a still image. The liquid crystal panel 10 may be configured, for example, by sealing a display layer (an unillustrated liquid crystal layer here) between two substrates, i.e., a TFT substrate 12B and a color filter (CF) substrate 12A. An unillustrated polarizing plate may be bonded to each of a surface on light entry side and a surface on light exit side of the liquid crystal panel 10. Moreover, a DBEF (a dual brightness enhancement film) 13 may be bonded to the polarizing plate on the light entry side with an adhesive layer 13a in between.

The TFT substrate 12B may be configured by arranging a plurality of pixel electrodes (not illustrated) in, for example, a matrix on a glass substrate. The TFT substrate 12B may include thin film transistor (TFT) elements for driving of the respective pixel electrodes, and lines such as gate lines and source lines (both not illustrated) that are coupled to the TFT elements. Each of the pixel electrodes may be formed of a conductive material having transparency such as indium tin oxide (ITO), and be provided for each sub-pixel (not illustrated) on the glass substrate.

The CF substrate 12A may be configured by providing color filters of colors such as red (R), green (G), and blue (B) in a regular arrangement on a glass substrate. A counter electrode (not illustrated) may be formed on an almost entire effective display region on the color filters. The counter electrode may be made of, for example, a conductive material having transparency such as ITO as with the pixel electrodes described above. It is to be noted that, although not illustrated here, a spacer may be provided between the counter electrode and the pixel electrodes on the TFT substrate 12B side to keep a gap between both substrates. Moreover, an alignment film for control of alignment of liquid crystal molecules may be formed on each of surfaces of the pixel electrodes and a surface of the counter electrode.

For example, in a case with a vertical alignment liquid crystal panel, the liquid crystal layer may include liquid crystal molecules having negative dielectric constant anisotropy and a polymer structure holding the liquid crystal molecules in proximity to an interface with an alignment film (not illustrated). The liquid crystal molecules may have a property of having a larger dielectric constant in a long axis direction than a dielectric constant in a short axis direction. This property may cause the liquid crystal molecules to align long axes thereof perpendicularly to the substrate upon turning off a drive voltage and to align the long axes thereof parallel to the substrate upon turning on the drive voltage. This may allow an image to be displayed on the liquid crystal display panel. Note that the liquid crystal layer may be sealed by a sealing section (not illustrated) provided on an outer edge of the liquid crystal layer and between the TFT substrate 12B and the CF substrate 12A.

The sealing resin layer 14A may be provided on the outer edge of the liquid crystal panel 10 as described above to planarize a level difference caused by a combination of members having different sizes (such as the substrate and the polarizing plate) on an end surface of a cell 11. At this occasion, the surface on display surface side of the sealing resin layer 14A and the surface of the liquid crystal panel 10 may form a same plane. As a constituent material of the sealing resin layer 14A, for example, a typical resin material may be used, but a light curing resin may be preferably used. Specific examples of the constituent material of the sealing resin layer 14A may include an acrylic resin, an epoxy resin, and a silicone resin. In particular, a resin that is less contracted after curing may be preferable, and the silicone resin may be suitable. The sealing resin layer 14A may be colored. For example, the sealing resin layer 14A may be colored in black to allow for reduction of light leakage from, for example, a side surface of the liquid crystal layer. Examples of a method of coloring the sealing resin layer 14A may include a method of adding a colorant, and a method of using a resin material that is discolored (colored) by light irradiation during curing. As the colorant, a colorant that makes it possible to maintain transmittance of the sealing resin material may be preferable. Examples of such a colorant may include carbon black and a metal-containing dye.

It is to be noted that the sealing resin layer 14A may be provided on the entirety of the outer edge of the rectangular liquid crystal panel 10, or only on a selected side of the outer edge. Moreover, the sealing resin layer 14A may be continuously formed, or may have a discontinuous part.

The soft resin layer 14B may be formed to be embedded in a portion of a gap between the liquid crystal panel 10 and the frame 18, and may be made of, for example, a soft (flexible) resin such as a urethane resin. The soft resin layer 14B may have a role of absorbing (releasing) stress resulting from a difference in coefficient of linear expansion between the frame 18 and the liquid crystal panel 10. As such a soft resin layer 14B, PORON (registered trademark) may be used, for example. In addition, as a constituent material of the soft resin layer 14B, a material having sufficient adhesion and sufficient elasticity may be used. Specific examples of such a material may include an acrylic resin, an epoxy resin, a vinyl chloride resin, and a modified silicone resin.

The optical sheet 15 may be configured of one or more sheets that exhibit various optical functions for light to be applied from the light guide plate unit 16 to the liquid crystal panel 10. Examples of the optical sheet 15 may include a laminated sheet including, for example, a prism sheet and a diffuser sheet. Alternatively, as the optical sheet 15, a sheet in which a light-condensing function and diffusion function are combined such as a so-called prism-on-microlens (POM) sheet may be used.

The light guide plate unit 16 may be a surface light source that illuminates the liquid crystal panel 10 on the basis of emitted light from a light source (not illustrated in FIG. 2) such as a light emitting diode (LED), as will be described in detail later. The light guide plate unit 16 may have, for example, a flat plate shape as with the liquid crystal panel 10.

The frame 18 may be a frame-like member having an opening that supports and contains, for example, the liquid crystal panel 10 and the light guide plate unit 16. As a constituent material of the frame 18, for example, metal having high thermal conductivity, for example, aluminum (Al) may be used. In addition, for example, iron (Fe), or plastic to which polycarbonate (PC) or an ABS resin is added may be used. It is to be noted that a case in which each of the liquid crystal panel 10 and the light guide plate unit 16 is adhered to the frame 18 by a resin is described here as an example; however, each of the liquid crystal panel 10 and the light guide plate unit 16 may be fixed to the frame 18 by fastening with use of a screw.

The adhesive resin layer 19 may be made of, for example, an ultraviolet curable resin. An end surface (side surface) of the light guide plate unit 16 may be adhered to the frame 18 by the adhesive resin layer 19.

The light shielding sheet 17 may be a black thin film, for example. It is only necessary for the light shielding sheet 17 here to have a light shielding effect regardless of the presence or absence of rigidity. In an example illustrated in FIG. 2, it is possible to secure predetermined rigidity by the frame 18 and the light guide plate unit 16. In other words, at this occasion, a member having rigidity such as a housing and a supporting member is not necessary on back surface side of the light guide plate unit 16. Hence, such a configuration is advantageous as a thin television. An unillustrated metal sheet, an unillustrated chassis, and unillustrated substrates may be further provided in a selective region on back surface side of the light shielding sheet 17 to allow for mounting of, for example, a circuit substrate or a speaker. Moreover, a mounting member for wall hanging or a screw hole may be provided.

(Specific Configuration of Light Guide Plate Unit 16)

FIG. 3 schematically illustrates a configuration of a main portion of the light guide plate unit 16. It is to be noted an axis Z is an optical axis passing through a light emission center of the light source 20 and a center of a light guide plate 21. The light guide plate unit 16 may include the light guide plate 21 that has, for example, two surfaces (surfaces S1 and S2) facing each other, and a plurality of light sources 20 that faces an end surface (a side surface) of the light guide plate 21. The light guide plate 21 may be configured of, for example, a portion (a light entry section 21A) on end surface side that faces the light source 10, and a light guiding section 21B that has the surfaces S1 and S2. Such a configuration may allow light entering through the light entry section 21A to propagate the inside of the light guiding section 21B and be outputted upward from the surface S2. In other words, for example, the optical sheet 15 and the liquid crystal panel 10 may be disposed on the surface S2 side of the light guiding section 21B. Note that the light guide plate unit 16 corresponds to a specific example of an "illumination section" of the present disclosure.

The light source 20 may include, for example, a light emitting diode (LED). More specifically, the light source 20 may be configured of an LED chip that emits color light such as red, blue or green light, or such an LED chip combined with, for example, a phosphor that emits, for example, white light by color mixture. However, the light source 20 is not limited to such LEDs, and may be configured of any other light source, for example, a fluorescent lamp extending in one direction. The light source 20 may be disposed to face only an end surface selected from four end surfaces (side surfaces) of the light guide plate 21 or to face two or more of the end surfaces.

A constituent material of the light guide plate 21 may be a material having high transparency, for example, glass; however, the light guide plate 21 may be made of any other material, as long as the material allows light from the light source 20 to propagate therethrough. The light guide plate 21 may be made of a light-scattering material in which light-scattering microparticles are dispersed, or a light diffusion material. Specific examples of the material may include an acrylic resin, polymethylmethacrylate (PMMA), polycarbonate (PC), and cyclic polyolefin (COP). For example, the shape, size, thickness, refractive index, concentration, and concentration distribution of the light guide plate 21 may be adjusted optionally to achieve desired characteristics. However, using glass for the light guide plate 21 and adopting a reflection sheet-integrated stacking configuration to be described below make it possible to secure rigidity of the light guide plate unit 16 or the display device 1, and to eliminate necessity to support the back surface side by a housing having a large thickness as described above, thereby achieving an device configuration that is advantageous for thickness reduction.

Diffusion dots 22a may be formed in a predetermined pattern on the surface S1 (the back surface, a light reflection surface) of the light guiding section 21B, and a reflection sheet 24 is bonded to the surface S1 by an adhesive layer 22 having a predetermined refractive index. In other words, the adhesive layer 22 is provided adjacent to the surface S1 of the light guiding section 21B, and the reflection sheet 24 is provided on the surface S1 with the adhesive layer 22 in between. In the present embodiment, a low refractive index layer 23 having a lower refractive index than the refractive index of the adhesive layer 22 may be provided between the adhesive layer 22 and the reflection sheet 24. In other words, the adhesive layer 22 and the low refractive index layer 23 may be stacked between the light guide plate 21 and the reflection sheet 24. A water vapor barrier layer 25 may be provided between the reflection sheet 24 and the light shielding sheet 17.

The adhesive layer 22 may be formed to cover the diffusion dots 22a formed on the surface S1 of the light guiding section 21B to planarize an uneven surface having a pattern of the diffusion dots 22a. The adhesive layer 22 may be made of an acrylic resin-based adhesive material having a refractive index (having an adjusted refractive index) that is substantially the same as (substantially equal to) the refractive index of the constituent material of the light guide plate 21 (the light guiding section 21B). For example, in a case in which the light guide plate 21 is made of glass having a refractive index of 1.52, the adhesive layer 22 may be made of a material having a refractive index (a refractive index $n_H$) of about 1.52. Moreover, a thickness of the adhesive layer 22 may be desirably set to a thickness (for example, about 40 µm or more) that is large enough to embed the diffusion dots 22A and sufficiently reduce an influence of air bubbles caused by the diffusion dots 22a.

The diffusion dots 22a may be pattern-formed on the surface S1 by screen printing, for example, and may have a thickness of about 10 µm, for example. As an ink of the diffusion dots 22a, for example, a predetermined solvent mixed with materials such as transparent silica, diffusion beads, titanium oxide, and a polyester resin may be used. Table 1 shows an example of a mixture ratio of ink materials. It is to be noted that "surface diffusion dots" in an upper section indicate a mixture ratio in a typical case in which the diffusion dots are formed on a light guide plate surface, and "internal diffusion dots" in a lower section correspond to the diffusion dots 22a of the present embodiment, and indicate a mixture ratio in a case in which the diffusion dots 22a are formed to be embedded inside the adhesive layer 22. Thus, the internal diffusion dots may desirably have a mixture ratio different in, for example, transparent silica, diffusion beads, and titanium oxide from the mixture ratio of the surface diffusion dots. The titanium oxide out of these materials contributes to internal diffusion, and the transparent silica and the diffusion beads contribute to surface diffusion. The transparent silica and the diffusion beads also have an ink viscosity adjustment function. As the polyester resin, it may be desirable to select a material having high adhesion with respect to the material (glass or the acrylic resin) of the light guide plate 21.

TABLE 1

|  | Transparent Silica | Diffusion Beads | Titanium Oxide | Polyester Resin | Solvent |
|---|---|---|---|---|---|
| Surface Diffusion Dots | 6.0% | 15.0% | 0.0% | 31.0% | 48.0% |
| Internal Diffusion Dots | 4.0% | 10.0% | 7.0% | 31.0% | 48.0% |

The low refractive index layer 23 is made of a material having a lower refractive index than the refractive index of the adhesive layer 22. For example, in a case in which the light guide plate 21 is made of glass having a refractive index of 1.52, for example, methyl silicone (a refractive index $n_L$=around 1.40), a fluorine-based material (a refractive index $n_L$=1.33 to 1.40 both inclusive), or a hollow silica-based material (a refractive index $n_L$=1.30 or less) may be used as the low refractive index layer 23. A thickness of the low refractive index layer 23 is smaller than the thickness of the adhesive layer 22, and may be about 2 µm, for example.

The reflection sheet (light reflection layer) 24 may have, for example, a function of reflecting white light, and may include, for example, white PET having high reflectivity, a resin multilayer film having high reflectivity, or a metal film having high reflectivity. Examples of a constituent material of the metal film may include silver (Ag) and aluminum (Al). A thickness of the reflection sheet 24 may be 150 µm, for example.

The water vapor barrier layer 25 may be a barrier layer for prevention of entry of water vapor (or water) from the back surface side. The water vapor barrier layer 25 may be made of a material having low water vapor permeability, and may be configured of, for example, PET, an aluminum (Al) evaporation film, an alumina ($Al_2O_3$) evaporation film, a high barrier film, glass, or aluminum foil. A thickness of the water vapor barrier layer 25 may be set depending on the material and necessary water vapor permeability, as appropriate.

The light entry section 21A may desirably have a tapered shape (a trapezoidal cross-sectional shape) that is narrowed toward the light source 20. For example, an inclination angle θt, a length dt1, and a height dt2 in the tapered shape of the light entry section 21A may each be desirably set to an appropriate value depending on, for example, the material and the thickness of the light guiding section 21B, a light emission width db and an emission wavelength of the light source 20, and a clearance ds between the light source 20 and the light entry section 21A. An angle of a light beam entering the light guiding section 21B may be adjusted by forming such a light entry section 21A. This may be advantageous in improvement in light guiding efficiency.

FIG. 4A and FIG. 4B each illustrate a design example of the light guide plate 21. It is to be noted that FIG. 4A and FIG. 4B illustrate propagation states of light beams entering from different angle directions (a so-called backlight beam and a so-called follow light beam). To give an example, in a case in which the light emission wavelength (a light emission central wavelength) of the light source 20 is 550 nm, a refractive index ng of the light guide plate 21 is 1.52; a thickness t of the light guide plate 21 is 2.5 mm; the inclination angle θt of the light entry section 21A is 6.7°, the length dt1 of the light entry section 21A is 3.0 mm; the height dt2 of the light entry section 21A is 0.35 mm; the light emission width db of the light source 20 is 1.0 mm, and the clearance ds is 0.5 mm. Thus, for example, a light beam that enters the light entry section 21A at an entry angle of 39.6° and is refracted at a refraction angle of 24.8° out of emitted light from the light source 20 enters the surface S1 at an entry angle equal to or larger than an critical angle (a critical angle θ2=65.2°) to be totally reflected, as illustrated in FIG. 4A. In contract, for example, a light beam that enters the light entry section 21A at a predetermined angle and is reflected by an inclined surface of the light entry section 21A out of the emitted light from the light source 20 enters the surface S1 at an entry angle equal to or smaller than the critical angle θ2, as illustrated in FIG. 4B. In this case, the light beam passes through an interface with the adhesive layer 22, and is reflected by an interface with one of the adhesive layer 22, the low refractive index layer 23, and the reflection sheet 24.

[Workings and Effects]

In the display device 1, when emitted light from the light guide plate unit 16 passes through, for example, the optical sheet 15 and the DBEF 13 and thereafter enters the liquid crystal panel 10, the light having entered is modulated in each pixel of the liquid crystal panel 10 to be outputted as image light from the cover film 11 side. Thus, an image is displayed.

At this occasion, in the light guide plate unit 16, after the light emitted from the light source 20 enters the light entry section 21A of the light guide plate 21, the light is refracted to a predetermined angle direction and propagates through the light guiding section 21B, as illustrated in FIG. 5. It is to be noted that an example in FIG. 5 is an example of light beam tracing in a case in which the light emission wavelength of the light source 20 is 550 nm; the material of the light guide plate 21 is glass having a refractive index of 1.52; and the thickness t, the inclination angle θt, the length dt1, the height dt2, the clearance ds of the light entry section 21A are set as with the design example illustrated in FIG. 4A and FIG. 4B. Moreover, it is assumed that the refractive index $n_H$ of the adhesive layer 22 is 1.52 and the refractive index $n_L$ of the low refractive index layer is 1.38.

In such a design, light (L0) emitted within an angle range of +60.9° and −60.9° with respect to the axis Z out of the light emitted from the light source 20 enters the light entry section 21A. The light L0 is refracted to an angle direction of, for example, 35.1° by an entry surface of the light entry section 21A, and the refracted light (L1a) is reflected to an angle direction of 28.4° with respect to the axis Z by the tapered shape of the light entry section 21A to enter the light guiding section 21B. Since the refractive indices of the light guide plate 21 and the adhesive layer 22 are substantially equal (for example, 1.52), the light (L1b) passes through the surface S1 and the adhesive layer 22, and thereafter enters an interface between the adhesive layer 22 and the low refractive index layer 23 at an entry angle of 61.6°. This light L1b passes through the interface, and is reflected by the reflection sheet 24, since the entry angle at the interface between the adhesive layer 22 and the low refractive index layer 23 is equal to or smaller than the critical angle θc2 (65.2°). In contrast, light (L2) having entered the inside of the light guiding section 21B in an angle direction of 24.8° is reflected at the interface between the adhesive layer 22 and the low refractive index layer 23. Thus, the light L1b and the light L2 reflected by the interface between the adhesive layer 22 and the low refractive index layer 23 or by the reflection sheet 24 propagate through the light guiding section 21B while repeating reflection described above, and thereafter, a total reflection condition (the critical angle θc1=41.1°) at the surface S2 is disturbed by the diffusion dots 22A, and the light L1b and the light L2 are drawn upward from the light guide plate 21.

FIG. 6 illustrates a configuration of a main portion of a light guide plate unit according to a comparative example 1. In the light guide plate unit of the comparative example 1, a light source 103 is provided to face an end surface of a light guide plate 101, and a reflection sheet 102 is provided on the surface S1 side. The reflection sheet 102 is provided on the light guide plate 101 with an air gap in between (the reflection sheet 102 is not bonded to the light guide plate 101). As a material of the light guide plate 101, an acrylic resin (a refractive index of 1.49) is used, and a thickness of the light guide plate 101 may be 3.0 mm, for example. The light emission wavelength of the light source 20 is 550 nm, and a clearance between the light source 20 and the light guide plate 101 may be 0.5 mm, for example. With such a configuration, light emitted within an angle range of +71.6° and −71.6° with respect to the axis Z out of light emitted from the light source 20 enters the light guide plate 101. The light having entered is refracted to an angle direction of, for example, 39.6°, and thereafter enters the surface S2 of the light guide plate 101 at an angle of 50.4° that is equal or larger than the critical angle (θc1=42.2°), and is totally reflected. In the configuration of the comparative example 1, since the refractive index of an air layer is 1.0, light guiding efficiency is high, but there is still a room for improvement in thickness reduction. It is to be noted that, in this case, scattering by a surface shape of the light guide plate 101 and a light recycling effect of an optical sheet cause light leakage on the surface S2 side; however, this light leakage is not completely blocked by the reflection sheet 102. Hence, a light shielding sheet is further bonded on the back surface side.

In the present embodiment, bonding the reflection sheet 24 to the light guide plate 21 makes it possible to achieve thickness reduction and superior design. In this bonding configuration, the adhesive layer 22 having a refractive index substantially equal to the refractive index of the light guide plate 21 is provided adjacent to the surface S1 of the light guide plate 21, and the low refractive index layer 23 having a lower refractive index than the refractive index of the adhesive layer 22 is stacked between the adhesive layer 22 and the reflection sheet 24. This makes it possible to increase return light to the inside of the light guide plate 21 as described above, and reduce light losses in a gap between the light guide plate 21 and the reflection sheet 24, thereby improving light guiding efficiency.

In particular, the adhesive layer 22 has a refractive index substantially equal to the light guide plate 21, which makes it possible to reduce refraction and reflection at the interface, thereby improving the light guiding efficiency. FIG. 7A illustrates an example of light beam tracing in a case in which an adhesive layer 104 made of a typical acrylic-based adhesive material (a refractive index of 1.47) is provided between the light guide plate 101 (a refractive index of 1.52) and a low refractive index layer 105 (a refractive index of 1.38) as a comparative example 2 of the present embodiment. FIG. 7B is an example of light beam tracing in a case in which the adhesive layer 22 having a high refractive index (1.52) of the present embodiment is used. In the comparative example 2 (FIG. 7A), light losses easily occur due to refraction and reflection at an interface where light enters from the adhesive layer 104 to the light guide plate 101. In contrast, in the present embodiment (FIG. 7B) that uses the adhesive layer 22 having a high refractive index, it can be seen that refraction and reflection at the an interface where light enters from the adhesive layer 22 to the light guiding section 21B are less likely to occur, which makes it possible to reduce light losses.

Moreover, providing the water vapor barrier layer 25 between the reflection sheet 24 and the light shielding sheet 17 makes it possible to suppress deterioration in the adhesive layer 22. FIG. 8 illustrates a schematic view for description of workings of the water vapor barrier layer 25. In the present embodiment, a metal sheet (a metal sheet 26) or a chassis is provided in a partial region on the back surface side of the display device 1 as described above; however, the entire back surface of the display device 1 is not covered with a supporting member made of, for example, metal. Therefore, water vapor X1 enters the inside of the adhesive layer 22 through the light shielding sheet 17 and the reflection sheet 24 in a region exposed from, for example, the metal sheet 26. There is a fear that the adhesive layer 22 is altered by an influence of the water vapor X1 to be deteriorated; however, providing the predetermined water vapor barrier layer 25 makes it possible to suppress such deterioration in the adhesive layer 22. It is to be noted that the water vapor barrier layer 25 may be bonded to the reflection sheet 24 with, for example, an adhesive layer 25a in between. Moreover, FIG. 9 illustrates an example of materials applicable as the water vapor barrier layer 25 (PET 75 μm, PET 188 μm, an Al evaporation film, a high barrier film, glass, and aluminum foil) and water vapor permeability of the materials. When an appropriate thickness is set depending on the permeability in such a manner, various materials may be used as the water vapor barrier layer 25. It is possible to suppress deterioration in the adhesive layer 22 and suppress pealing of the light guide plate 21 and the reflection sheet 24, thereby favorably achieving the above-described effect of improving light guiding efficiency.

As described above, in the present embodiment, the reflection sheet 24 is bonded to the surface S1 of the light guide plate 21 with the adhesive layer 22 in between, and the adhesive layer 22 has substantially the same refractive index as the refractive index of the light guide plate 21, which makes it possible to reduce light losses in a gap between the light guide plate 21 and the reflection sheet 24. This allows for reduction in light losses in the light guide plate unit 16 to improve light guiding efficiency.

It is to be noted that it is possible to use, for example, glass and an acrylic resin as the constituent material of the light guide plate 21; however, light transmittance slightly differs in each of the materials. For example, when the acrylic resin (a solid line A1) and high transparent glass (a broken line A1) are compared with each other, characteristics slightly differ as illustrated in FIG. 10. Moreover, it can be seen that the acrylic resin (A1) has constantly high transmittance irrespective of a wavelength region (throughout a range from 380 nm to 780 nm both inclusive here), whereas the glass (A2) has transmittance differing depending on a wavelength region. Further, in the light source 20, intensity of a peak wavelength (central wavelength) differs in each light emission wavelength region depending on the constituent material of the LED and the kind of the phosphor, as illustrated in FIG. 11. Therefore, in particular, in a case in which glass is used for the light guide plate 21, design may be desirably made in consideration of the light emission wavelength of the light source 20 and transmittance characteristics of the glass. For example, a glass material of the light guide plate 21 may be selected to achieve highest transmittance in the light emission wavelength region of the light source 20. Alternatively, an LED light source having a peak wavelength in a wavelength region in which transmittance of glass to be used is highest may be selected. In order to improve light guiding efficiency, it may be desirable to optimize a combination of the constituent material of the light guide plate 21 and the light emission wavelength of the light source 20.

Next, description is given of a modification example of the foregoing embodiment. Substantially same components as the components of the foregoing embodiment are denoted by same reference numerals, and any redundant description thereof is omitted.

Modification Example

FIG. 12 illustrates a configuration of a main portion of a light guide plate unit according to a modification example. In the foregoing embodiment, the low refractive index layer 23 is interposed between the adhesive layer 22 and the reflection sheet 24; however, the low refractive index layer 23 may not be provided. In other words, as with the present modification example, the adhesive layer 22 may be provided adjacent to the surface S1 of a light guide plate 30, and the reflection sheet 24 may be provided adjacent to the adhesive layer 22. In this case, as the reflection sheet 24, for example, a metal film such as silver or aluminum or a multilayer light interference reflection film may be used. Moreover, in the foregoing embodiment, the light entry section 21A having a tapered shape is provided to face the light source 20; however, the light entry section 21A may not be necessarily provided. The light shielding sheet 17 may be bonded on the back surface side of the reflection sheet 24. As with the light guide plate 21 in the foregoing embodiment, the light guide plate 30 may be made of, for example, a material such as an acrylic resin or glass, and may be desirably made of glass in terms of thickness reduction. Further, the adhesive layer 22 may have substantially the same refractive index as a refractive index of the light guide plate 30. Even such a configuration makes it possible to reduce light losses in a gap between the light guide plate 30 and the reflection sheet 24, as compared with a case in which an adhesive layer having a typical refractive index is used. However, in order to further enhance light guiding efficiency, as with the foregoing embodiment, the low refractive index layer 23 may be desirably interposed between the adhesive layer 22 and the reflection sheet 24. Moreover, the predetermined light entry section 21A may be desirably provided to face the light source 20, thereby adjusting an angle of light entering the light guiding section 21B.

Although description has been made by giving the embodiment and the modification example as mentioned above, the present disclosure is not limited thereto and may be modified in a variety of ways. For example, in the foregoing embodiment and examples, a configuration in which only the side surfaces (end surfaces) of the liquid crystal panel 10 and the light guide plate unit 16 are supported by the frame 28 is described as an example; however, the display device of the present disclosure is not limited to such an example. For example, the liquid crystal panel 10 and the light guide plate unit 16 may be contained inside a housing that also supports back surfaces of the liquid crystal panel 10 and the light guide plate unit 16. For example, in a case in which, for example, an acrylic resin is used as the light guide plate material, it may be desirable to provide a supporting member on back surface side in order to enhance strength of the entirety of the device.

Moreover, respective components described in the foregoing embodiment and examples are merely examples, and it is not necessary to provide all of the components, and any other component may be further provided. For example, as a heat dissipation mechanism with respect to heat generated by the light source 20, a heat sink may be adhered to at least a portion of the back surface of the display device. An example of the portion may be a lower end portion where the light source 20 is provided. The heat sink may desirably use metal having superior heat conductivity, and may use a molded block such as Al.

It is to be noted that the effects described in this description are illustrative and non-limiting. The present disclosure may have any other effects.

Moreover, the present disclosure may have the following configurations.

(1)

A display device provided with a display panel and an illumination section that illuminates the display panel, the illumination section including:

a light guide plate having a first surface and a second surface facing each other;

a light source facing an end surface of the light guide plate;

an adhesive layer formed adjacent to the first surface of the light guide plate and having substantially the same refractive index as a refractive index of the light guide plate; and a light reflection layer bonded to the first surface of the light guide plate with at least the adhesive layer in between.

(2)

The display device according to (1), further including a low refractive index layer between the adhesive layer and the light reflection layer, the low refractive index layer having a lower refractive index than the refractive index of the adhesive layer.

(3)

The display device according to (1) or (2), wherein the light guide plate has a tapered shape in a portion on end surface side facing the light source.

(4)

The display device according to any one of (1) to (3), wherein diffusion dots are formed on the first surface of the light guide plate, and the adhesive layer is provided to cover the diffusion dots.

(5)

The display device according to any one of (1) to (4), further including a light shielding layer on side opposite to the display panel of the light reflection layer.

(6)

The display device according to (5), further including a water vapor barrier layer between the light reflection layer and the light shielding layer.

(7)

The display device according to any one of (1), (3), and (5), wherein the light reflection layer is provided adjacent to the adhesive layer.

(8)

The display device according to any one of (1) to (7), wherein the light guide plate is made of glass.

(9)

The display device according to any one of (1) to (8), wherein the display panel is a liquid crystal panel.

(10)

An illumination device, including:

a light guide plate having a first surface and a second surface facing each other;

a light source facing an end surface of the light guide plate;

an adhesive layer formed adjacent to the first surface of the light guide plate and having substantially the same refractive index as a refractive index of the light guide plate; and a light reflection layer bonded to the first surface of the light guide plate with at least the adhesive layer in between.

This application is based upon and claims the benefit of priority of the Japanese Patent Application No. 2014-174201 filed in the Japan Patent Office on Aug. 28, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device provided with a display panel and an illumination section that illuminates the display panel, the illumination section comprising:

a light guide plate having a first surface and a second surface facing each other, the light guide plate having a light entry section and a light guide section in which the light entry section has a tapered shaped portion that extends from the light guide section and terminates in an end surface;

a light source facing and adjacent the end surface of the light entry section of the light guide plate so as to emit light into the tapered shaped portion of the light entry section;

an adhesive layer formed adjacent to the first surface of the light guide plate and having substantially the same refractive index as a refractive index of the light guide plate;

a light reflection layer bonded to the first surface of the light guide plate with at least the adhesive layer in between;

a low refractive index layer between, and provided adjacent to, the adhesive layer and the light reflection layer, such that the low refractive index layer and the adhesive layer are in an integrated stack configuration with the light guide plate and the light reflection layer, and in which the low refractive index layer extends from a surface of the adhesive layer facing the light reflection layer, to form an interface co-extensive with the surface of the adhesive layer; and an optical sheet disposed on the second surface of the light guide plate and including a curved section arranged to abut a corner section of the second surface of the light guide plate.

2. The display device according to claim 1, wherein diffusion dots are formed on the first surface of the light guide plate and the adhesive layer is provided to cover the diffusion dots.

3. The display device according to claim 1, further comprising a light shielding layer on a side of the light reflection layer which is opposite another side of the light reflection layer that faces the display panel.

4. The display device according to claim 3, further comprising a water vapor barrier layer between the light reflection layer and the light shielding layer.

5. The display device according to claim 1, wherein the light reflection layer is provided adjacent to the adhesive layer.

6. The display device according to claim 1, wherein the light guide plate is made of glass.

7. The display device according to claim 1, wherein the display panel is a liquid crystal panel.

8. An illumination device, comprising:

a light guide plate having a first surface and a second surface facing each other, the light guide plate having a light entry section and a light guide section in which the light entry section has a tapered shaped portion that extends from the light guide section and terminates in an end surface;

a light source facing and adjacent the end surface of the light entry section of the light guide plate so as to emit light into the tapered shaped portion of the light entry section;

an adhesive layer formed adjacent to the first surface of the light guide plate and having substantially the same refractive index as a refractive index of the light guide plate;

a light reflection layer bonded to the first surface of the light guide plate with at least the adhesive layer in between;

a low refractive index layer between, and provided adjacent to, the adhesive layer and the light reflection layer, such that the low refractive index layer and the adhesive layer are in an integrated stack configuration with the light guide plate and the light reflection layer, and in which the low refractive index layer extends from a surface of the adhesive layer facing the light reflection layer, to form an interface co-extensive with the surface of the adhesive layer; and an optical sheet disposed on the second surface of the light guide plate and including a curved section arranged to abut a corner section of the second surface of the light guide plate.

9. The display device according to claim 1, wherein the low refractive index layer has a lower refractive index than the refractive index of the adhesive layer.

10. The illumination device according to claim 8, wherein the low refractive index layer has a lower refractive index than the refractive index of the adhesive layer.

11. The display device according to claim 1, wherein diffusion dots are formed on the first surface of the light guide plate.

12. The illumination device according to claim 8, wherein diffusion dots are formed on the first surface of the light guide plate.

13. The display device according to claim 1, wherein the tapered section comprises an inclination angle between the end surface and the light guide section, the inclination angle being dependent on a thickness of the light guide section or a material the light guide section.

\* \* \* \* \*